US011066016B2

(12) United States Patent
Gandhi et al.

(10) Patent No.: US 11,066,016 B2
(45) Date of Patent: Jul. 20, 2021

(54) ADJUSTING VEHICLE MIRRORS

(71) Applicant: Toyota Motor Engineering & Manufacturing North America, Inc., Plano, TX (US)

(72) Inventors: Umesh N. Gandhi, Farmington Hills, MI (US); Danil V. Prokhorov, Canton, MI (US); Michael Paul Rowe, Pinckney, MI (US); Ryohei Tsuruta, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 99 days.

(21) Appl. No.: 15/929,072

(22) Filed: Dec. 18, 2018

(65) Prior Publication Data

US 2020/0189469 A1   Jun. 18, 2020

(51) Int. Cl.
*G02B 5/08* (2006.01)
*G02B 7/18* (2021.01)
(Continued)

(52) U.S. Cl.
CPC ............... *B60R 1/072* (2013.01); *B60R 1/04* (2013.01); *B60R 1/12* (2013.01); *G06F 3/013* (2013.01); *B60R 2001/1284* (2013.01)

(58) Field of Classification Search
CPC .. B60R 1/072; B60R 1/12; B60R 1/04; B60R 2001/1284; B60R 1/0625; B60R 1/013;
(Continued)

(56) References Cited

U.S. PATENT DOCUMENTS 2,241,086 A   1/1939   Gould
4,286,910 A   9/1981   Conrad
(Continued)

FOREIGN PATENT DOCUMENTS

DE   102012208212 A1   11/2012
JP   2007097292 A   4/2007
(Continued)

OTHER PUBLICATIONS

Acome et al., "Hydraulically Amplified Self-Healing Electrostatic Actuators with Muscle-Like Performance," Science, vol. 359, Issue 6371, pp. 61-65 (Jan. 5, 2018) (6 pages).
(Continued)

*Primary Examiner* — Mustak Choudhury
(74) *Attorney, Agent, or Firm* — Christopher G. Darrow; Darrow Mustafa PC

(57) ABSTRACT

A mirror assembly can include a mirror and one or more actuators operatively positioned to cause the position and/or the orientation of the mirror to be adjusted. The one or more actuators include a bladder. The bladder can include a flexible casing. The bladder can define a fluid chamber. The fluid chamber can contain a dielectric fluid. The one or more actuators can include a first conductor and a second conductor operatively positioned on opposite portions of the bladder. The one or more actuators can be configured such that, when electrical energy is supplied to the first conductor and the second conductor, the first conductor and the second conductor can become oppositely charged. As a result, the first conductor and the second conductor are electrostatically attracted toward each other to cause at least a portion of the dielectric fluid to be displaced to an outer peripheral region of the fluid chamber.

17 Claims, 6 Drawing Sheets

(51) Int. Cl.
  *B60R 1/072* (2006.01)
  *G06F 3/01* (2006.01)
  *B60R 1/12* (2006.01)
  *B60R 1/04* (2006.01)

(58) Field of Classification Search
  CPC .......... B60R 1/089; G06F 3/013; F21S 41/63; F21S 41/285; F15B 15/08; F15B 15/088; F15B 15/10; F15B 21/06; F15B 21/065; B60Q 1/076; B60Q 1/085; B60Q 1/122; B60Q 1/115
  See application file for complete search history.

(56) References Cited

U.S. PATENT DOCUMENTS

| | | | |
|---|---|---|---|
| 4,319,427 | A | 3/1982 | Way, Jr. |
| 4,726,656 | A * | 2/1988 | Schofield ................ B60R 1/089 359/603 |
| 5,065,978 | A | 11/1991 | Albarda et al. |
| 6,065,978 | A | 5/2000 | Dehan et al. |
| 6,120,002 | A | 9/2000 | Biegelsen et al. |
| 6,215,221 | B1 | 4/2001 | Cabuz et al. |
| 6,490,960 | B1 | 12/2002 | Jackson et al. |
| 6,685,442 | B2 | 2/2004 | Chinn et al. |
| 6,939,291 | B2 | 9/2005 | Phee Soo Jay |
| 7,353,747 | B2 | 4/2008 | Swayze et al. |
| 7,484,735 | B2 | 2/2009 | Verbrugge et al. |
| 7,673,562 | B2 | 3/2010 | Pattekar et al. |
| 7,892,630 | B1 | 2/2011 | McKnight et al. |
| 7,901,524 | B1 | 3/2011 | McKnight et al. |
| 7,905,538 | B2 | 3/2011 | Ukpai et al. |
| 8,222,799 | B2 | 7/2012 | Polyakov et al. |
| 8,240,677 | B2 | 8/2012 | Browne et al. |
| 8,272,392 | B2 | 9/2012 | Pattekar et al. |
| 8,430,810 | B2 | 4/2013 | Hassidov et al. |
| 8,863,608 | B2 | 10/2014 | Fischer et al. |
| 9,061,118 | B2 | 6/2015 | Shoham et al. |
| 9,764,113 | B2 | 9/2017 | Tuval et al. |
| 9,790,968 | B2 | 10/2017 | Yang et al. |
| 10,058,647 | B2 | 8/2018 | Roche et al. |
| 10,293,718 | B1 | 5/2019 | Ilievski et al. |
| 10,631,083 | B1 | 4/2020 | Gandhi et al. |
| 10,640,033 | B1 | 5/2020 | Gandhi et al. |
| 10,682,903 | B1 | 6/2020 | Gandhi et al. |
| 10,682,931 | B2 | 6/2020 | Rowe et al. |
| 2002/0100888 | A1 | 8/2002 | Sharma et al. |
| 2004/0107829 | A1 | 6/2004 | Davis et al. |
| 2004/0261411 | A1 | 12/2004 | MacGregor |
| 2005/0045480 | A1 | 3/2005 | Krumme |
| 2005/0198904 | A1 | 9/2005 | Browne et al. |
| 2005/0200984 | A1 | 9/2005 | Browne et al. |
| 2005/0206096 | A1 | 9/2005 | Browne et al. |
| 2006/0038745 | A1 | 2/2006 | Naksen et al. |
| 2007/0046074 | A1 | 3/2007 | Satta et al. |
| 2007/0120438 | A1 | 5/2007 | Divoux |
| 2007/0246898 | A1 | 10/2007 | Keefe et al. |
| 2009/0086331 | A1 | 4/2009 | Gunasekaran et al. |
| 2009/0115285 | A1 * | 5/2009 | Najafi ........................ F15B 7/00 310/300 |
| 2010/0258362 | A1 | 10/2010 | Trimmer |
| 2011/0188258 | A1 | 8/2011 | Tajima |
| 2012/0287493 | A1 | 11/2012 | Kuhlman et al. |
| 2013/0255815 | A1 | 10/2013 | Brinkmann et al. |
| 2013/0304049 | A1 | 11/2013 | Behnke, II et al. |
| 2013/0318962 | A1 | 12/2013 | Joshi et al. |
| 2015/0022664 | A1 | 1/2015 | Pflug et al. |
| 2015/0331156 | A1 | 11/2015 | Hirsa |
| 2016/0106620 | A1 | 4/2016 | Uno et al. |
| 2017/0150252 | A1 | 5/2017 | Trestain et al. |
| 2018/0036198 | A1 | 2/2018 | Mergl et al. |
| 2018/0172172 | A1 | 6/2018 | Oehler et al. |
| 2018/0339624 | A1 | 11/2018 | Leck |
| 2019/0023161 | A1 | 1/2019 | Sullivan et al. |
| 2019/0032684 | A1 | 1/2019 | Kowalewski et al. |
| 2019/0059608 | A1 | 2/2019 | Yan et al. |
| 2019/0232822 | A1 | 8/2019 | Hintermaier |
| 2019/0296217 | A1 | 9/2019 | Jung et al. |
| 2020/0032822 | A1 * | 1/2020 | Keplinger ............... F15B 21/06 |
| 2020/0130202 | A1 | 4/2020 | Gandhi et al. |
| 2020/0130321 | A1 | 4/2020 | Gandhi et al. |
| 2020/0132213 | A1 | 4/2020 | Gandhi et al. |
| 2020/0132223 | A1 | 4/2020 | Prokhorov et al. |
| 2020/0136525 | A1 | 4/2020 | Gandhi et al. |
| 2020/0136526 | A1 | 4/2020 | Gandhi et al. |
| 2020/0156314 | A1 | 5/2020 | Rowe et al. |
| 2020/0182269 | A1 | 6/2020 | Rowe |
| 2020/0216121 | A1 | 7/2020 | Gandhi et al. |
| 2020/0238854 | A1 | 7/2020 | Gandhi et al. |
| 2020/0259426 | A1 | 8/2020 | Rowe |

FOREIGN PATENT DOCUMENTS

| | | |
|---|---|---|
| KR | 20050056526 A | 6/2005 |
| WO | 2017077541 A1 | 5/2017 |
| WO | 2018175741 A1 | 9/2018 |

OTHER PUBLICATIONS

Knoss, "Next-gen flexible robots move and heal like us," CU Boulder Today, Jan. 4, 2018, retrieved from the Internet: <https://www.colorado.edu/today/2018/01/04/next-gen-flexible-robots-move-and-heal-us>, [retrieved Mar. 30, 2018] (6 pages).

Yang et al., "Novel Design and Three-Dimensional Printing of Variable Stiffness Robotic Grippers," Dec. 2016, ASME Journal of Mechanisms and Robotics, vol. 8, pp. 061010-1 to 061010-15 (15 pages).

SMC Tech, "Precision Regulator: Series IR1000/2000/3000", SMC Tech, pp. 713-725 and 1-19, 2015 (53 pages).

* cited by examiner

ADJUSTING VEHICLE MIRRORS

FIELD

The subject matter described herein relates to vehicle mirrors and, more particularly, to the adjustment of vehicle mirrors.

BACKGROUND

Modern travel is dependent upon land travel in all conditions and at all times of day. However, such travel may be dangerous when the driver cannot adequate observe the contours of the road or obstacles on the road. Land vehicles are generally equipped with mirrors as a standard feature. Such mirrors allow drivers to quickly and more safely see areas that they normally could not see without turning their head significantly.

SUMMARY

In one respect, the subject matter presented herein is directed to a mirror assembly. The mirror assembly can include a mirror and one or more actuators operatively positioned to cause a position and/or an orientation of the mirror to be adjusted. The one or more actuators can include a bladder. The bladder can include a flexible casing and can define a fluid chamber. The fluid chamber includes a dielectric fluid. The one or more actuators can include a first conductor and a second conductor operatively positioned on opposite portions of bladder. The one or more actuators can be configured such that, when electrical energy is supplied to the first conductor and the second conductor, the first conductor and the second conductor can have opposite charges. As a result, the first conductor and the second conductor can be electrostatically attracted toward each other, which, in turn, can cause at least a portion of the dielectric fluid to be displaced to an outer peripheral region of the fluid chamber.

In another respect, the subject matter presented herein is directed to a mirror system. The system can include a base and a mirror operatively connected to a base. The system can include one or more actuators operatively connected to the base. The one or more actuators can include a bladder. The bladder can include a flexible casing and can define a fluid chamber. The fluid chamber can include a dielectric fluid. The one or more actuators can include a first conductor and a second conductor operatively positioned on opposite portions of bladder. The one or more actuators can be configured such that, when electrical energy is supplied to the first conductor and the second conductor, the first conductor and the second conductor have opposite charges. As a result, the first conductor and the second conductor can be electrostatically attracted toward each other such that cause at least a portion of the dielectric fluid is displaced to an outer peripheral region of the fluid chamber. The one or more actuators can be operatively positioned to adjust a position and/or an orientation of the mirror. The system can include a power source operatively connected to supply electrical energy to first conductor and the second conductor. The system can include one or more processors operatively connected to selectively control a supply of electrical energy from the power source to the first conductor and the second conductor.

In yet another respect, the subject matter presented herein is directed to a method of adjusting a vehicle mirror. The method can include detecting a mirror trigger. The method can include, responsive to detecting a mirror trigger, determining a target mirror position or orientation based on the mirror trigger. The method can include causing one or more actuators to actuate to alter a position or orientation of the mirror to the target mirror position or orientation. The actuator(s) can include a flexible casing defining a fluid chamber. The fluid chamber can include a dielectric fluid. The one or more actuators can include a first conductor and a second conductor operatively positioned on opposite portions of bladder. The one or more actuators can be configured such that, when electrical energy is supplied to the first conductor and the second conductor, the first conductor and the second conductor have opposite charges. As a result, the first conductor and the second conductor can be electrostatically attracted toward each other such that cause at least a portion of the dielectric fluid is displaced to an outer peripheral region of the fluid chamber.

DETAILED DESCRIPTION

Arrangements described herein are generally related to the mirrors of a vehicle, such as a rear-view mirror or a side-view mirror. The mirrors can be actuated to change a position and/or an orientation of the mirrors to attain a desired view. The position and/or the orientation of the mirrors can be altered using one or more actuators operatively positioned with respect to the mirrors. The actuators can include a bladder defining a fluid chamber that contains a dielectric fluid. The actuators can include a first conductor and a second conductor operatively positioned on opposite portions of the bladder. The actuators can be configured such that, when electrical energy is supplied to the first conductor and the second conductor, they are electrostatically attracted toward each other. As a result, at least a portion of the dielectric fluid to be displaced to an outer peripheral region of the fluid chamber, causing the region to bulge.

Figure 1:
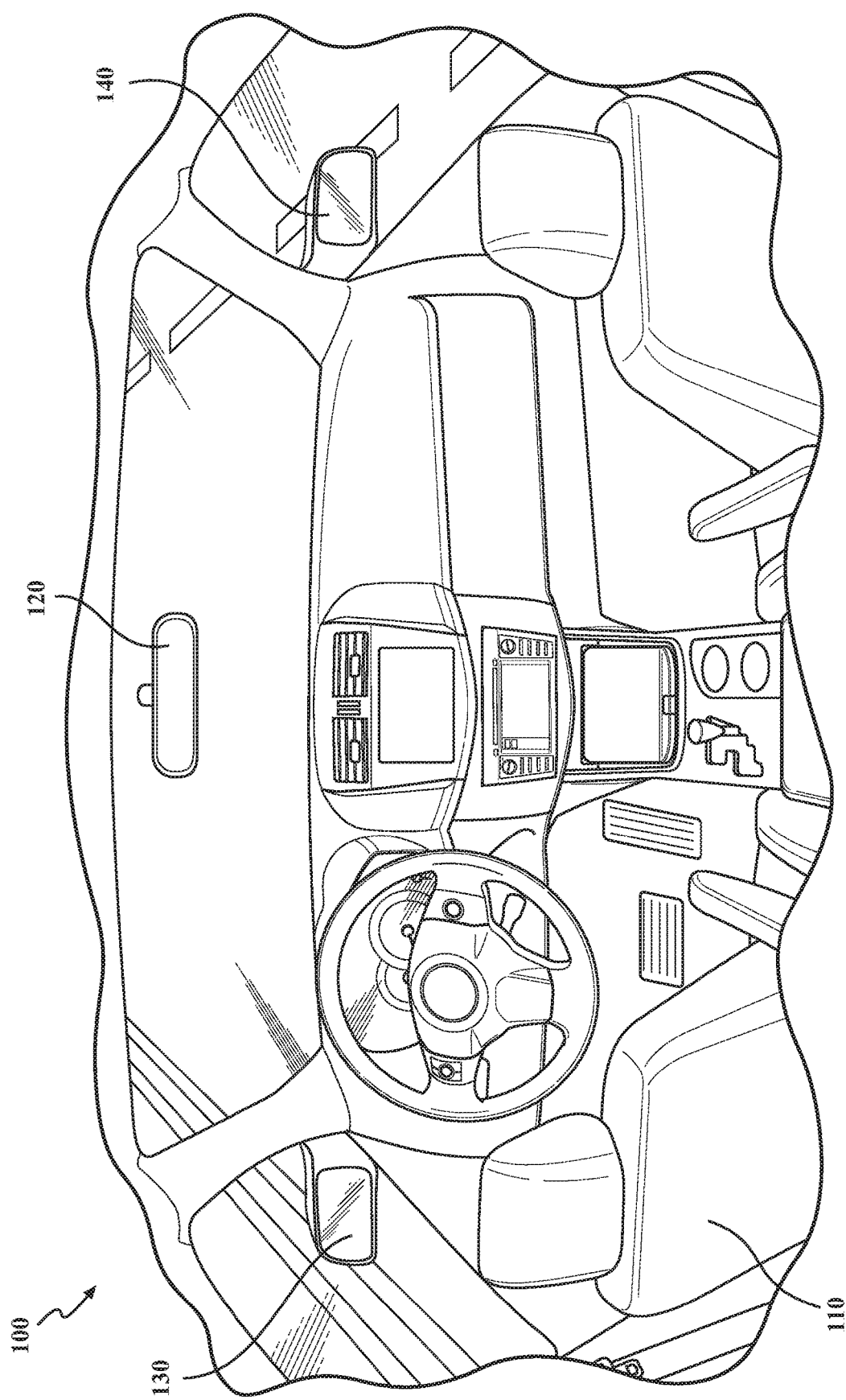
FIG. 1 depicts an example of a vehicle interior, showing a rear-view mirror and side-view mirrors.

Referring to FIG. 1, an example of a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In some implementations, the vehicle may be a watercraft, an aircraft or any other form of motorized transport.

The vehicle 100 can have an autonomous operational mode and/or a semi-autonomous operational mode. For instance, the vehicle 100 can have an autonomous operational mode in which or more computing systems are used to navigate and/or maneuver the vehicle along a travel route with no input or supervision required from a human driver. The vehicle 100 can have one or more semi-autonomous operational modes in which a portion of the navigation and/or maneuvering of the vehicle along a travel route is performed by one or more computing systems, and a portion of the navigation and/or maneuvering of the vehicle along a travel route is performed by a human driver. The vehicle 100 can have a manual operational mode in which all of or a majority of the navigation and/or maneuvering of the vehicle is performed by a human driver. In one or more arrangements, the vehicle 100 can be a conventional vehicle that is configured to operate in only a manual mode.

In one or more arrangements, vehicle 100 includes actuated rear-view mirror 120, which can be positioned to give a rear-view of the vehicle to a driver. While a single rear-view mirror 120 is shown in FIG. 1, there may be any number of rear-view mirrors 120. The vehicle 100 also includes one or more side view mirrors, such as left-side side view mirror 130 and right-side side view mirror 140. The side view mirrors 130, 140 can be positioned to increase a driver's view when located in the driver's seat 110. While two side view mirrors are shown in FIG. 1, there may be any number of rear-view mirrors 120. According to arrangements herein, the mirrors may be selectively actuated independently of each other, or they may be actuated in groups, including but not limited to one large group. The mirrors can move and be controlled independently from one another for various purposes and utilities. In one or more arrangements, one or more side-view mirrors can autonomously actuate to show an object in the vehicle's blind spot. While arrangements will be described herein in connection with rear-view mirrors and side-view mirrors, it will be appreciates that the arrangements can be used in connection with other mirrors with a vehicle, such as personal mirrors, grooming mirrors, mirrors integrated with visors, and other mirrors.

The mirrors 120, 130, and 140 can be adjusted on one or more axes. For example, the mirrors 120, 130, and 140 can be adjusted (e.g., rotating, tilting, etc.) relative to a substantially vertical axis (e.g., yaw axis) to control which lateral direction the mirrors 120, 130, and 140 are angled. Further, the mirrors 120, 130, and 140 can be adjusted (e.g. rotating, tilting, etc.) relative to a substantially horizontal axis (e.g., pitch axis which is a horizontal axis substantially perpendicular to a longitudinal direction of the vehicle) to control the up-down angle of the mirrors 120, 130, and 140. The term "longitudinal direction of the vehicle" means an axis going through the center of the vehicle, extending through the front end and the back end of the vehicle. Even further, the mirrors 120, 130, and 140 can be controlled on a roll axis to control to give rotational control of the actuated mirrors 120, 130, and 140. Roll axis is an axis that is substantially orthogonal to any point on the mirror reflective surface. This allows control of the actuated mirrors 120, 130, and 140, to fine tune a driver's field of view when looking in them. In some instances, the mirrors 120, 130, 140 can be adjusted by extending and/or retracting substantially in a longitudinal direction of the vehicle, such as along an axis substantially in and/or substantially parallel to the longitudinal direction of the vehicle. As used herein, the term "substantially" includes exactly the term it modifies and slight variations therefrom. For instance, the term "substantially parallel" means exactly parallel and slight variations therefrom. Slight variations therefrom can include being within about 10 degrees/percent/units or less, within about 5 degrees/percent/units or less, within about 4 degrees/percent/units or less, within about 3 degrees/percent/units or less, within about 2 degrees/percent/units or less, or within about 1 degrees/percent/unit or less. In some instances, "substantially" can include being within normal manufacturing tolerances.

Referring to FIGS. 3A-3D, various view of an example of a mirror assembly 300 is depicted. It will be understood that it is not necessary for the mirror assembly 300 to have all of the elements shown in FIGS. 3A-3D or described herein. The mirror assembly 300 can have any combination of the various elements shown in FIG. 3. Further, the mirror assembly 300 can have additional elements to those shown in FIG. 3. In some arrangements, the mirror assembly 300 may not include one or more of the elements shown in FIG. 3. Still further, the various elements depicted in FIG. 3 can be arranged in ways other than which is shown in FIG. 3.

The mirror assembly 300 can include a mirror 310. The mirror 310 can be any mirror, now known or later developed. In some arrangements, the mirror assembly 300 can include a base 320. The mirror 310 can be operatively connected to the base 320. The term "operatively connected," as used throughout this description, can include direct or indirect connections, including connections without direct physical contact. In some instances, the mirror 310 and the base 320 can be fixedly connected together, such that relative motion between the two components can be minimized. The mirror 310 can be operatively connected to the base 320 in any suitable manner, such as one or more fasteners, one or more adhesives, and/or one or more forms of mechanical engagement, just to name a few possibilities.

The base 320 may be made of any suitable material. For instance, the base 320 can be made of a rigid material. The base 320 can be made of a material with a high tensile strength that is resilient to stretching or bending, such as plastic or metal. In some arrangements, the base 320 may be integrated with a back wall of the housing, behind the mirror, such that the base 320 and the back wall of the housing are the same piece of material. The base 320 can be any suitable shape. For example, the base 320 can be square, quadrilateral, triangle, rectangular, pentagonal, hexagonal, octagonal, a polygon, circular, ovular, annular, lunar, or semi-circular. The base 320 can be a substantially planar structure, as shown in FIGS. 3A-3D. However, it will be appreciated that the base 320 can be any of a variety of non-planar shapes. The mirror 310 can be operatively positioned at any suitable position relative to the base 320. For example, the mirror 310 can be centrally positioned the base 320, or the mirror 310 can be located in an offset position on the base 320. In some embodiments, the mirror assembly 300 may not include a base.

The mirror 310 may be adjusted to change what it reflects for any useful purpose. For example, the mirrors' angle may be adjusted to change what can be seen in the mirrors' field of view. In some embodiments, it may be beneficial to control mirrors independent from one another.

Figure 3A:
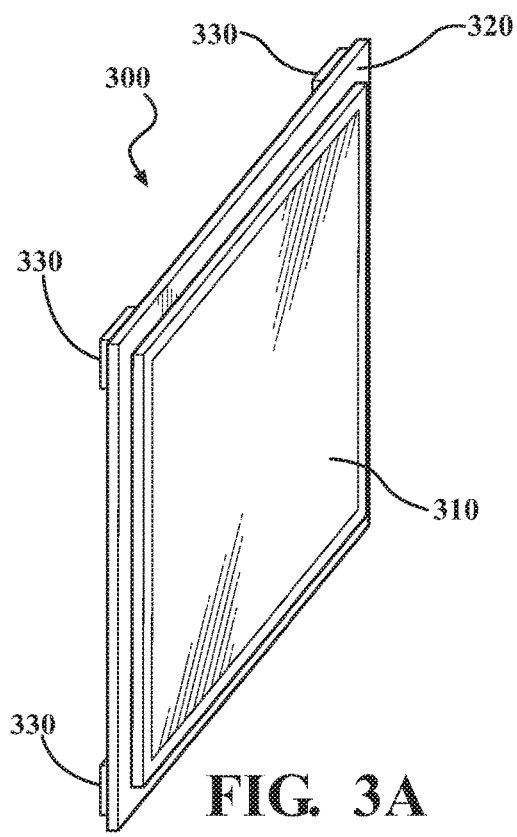
FIGS. 3A-3D present various views of an example of a mirror assembly.
Figure 3B:
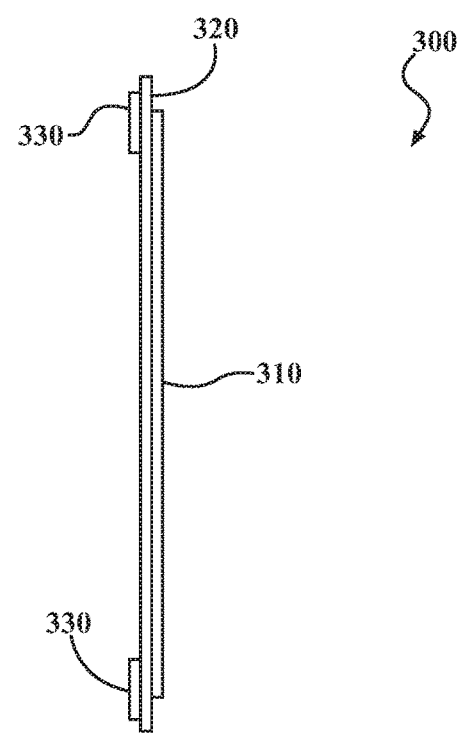
Figure 3C:
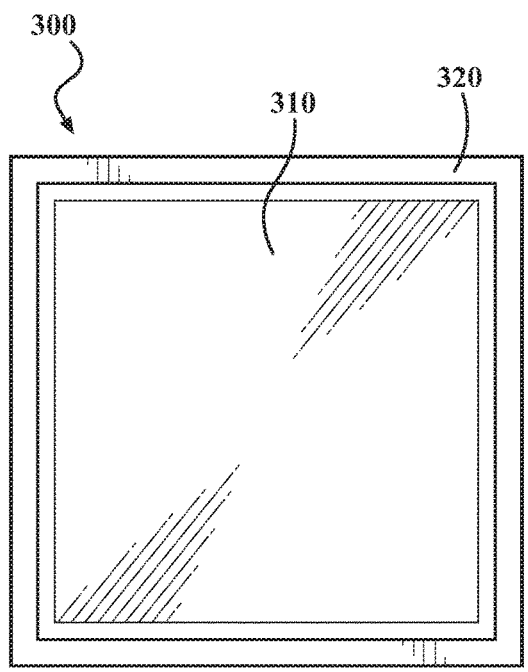
Figure 3D:
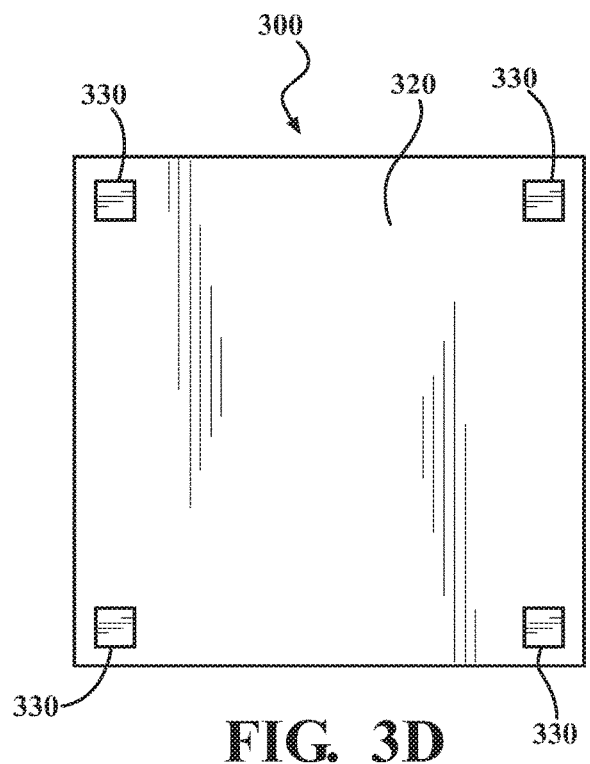

The actuators 330 can be independently actuated, the actuators 330 may actuate together, or the actuators 330 may actuate in any other manner to cause a desired movement of the mirror 310. Various combinations of selective actuation and non-actuation of the actuators 330 is possible that would allow for various positions and/or orientations of the mirror 310. For example, if the two actuators 330 on the left in FIG. 3D are actuated but the two actuators on the right in FIG. 3D are not actuated, the mirror 310 will yaw to the right. Alternatively, if the two left actuators 330 were not actuated and the two right actuators 330 were actuated, then the mirror 310 would be angled to the left. As a further example, if the top two actuators 330 in FIG. 3D were actuated and the bottom two actuators 330 were not actuated, then the mirror 310 would be angled in a generally downward direction. On the other hand, if the top two actuators 330 were not actuated and the bottom two actuators 330 were actuated, then the mirror 310 would be angled in a generally upward direction. The terms top, bottom, left, and right are merely used relative to FIG. 3D. It will be understood that these terms are merely used for convenience to facilitate the discussion and are not intended to be limiting.

In some arrangements, the entire mirror assembly 300 can be reoriented when the actuators 330 are actuated. However, in an alternate embodiment, a housing can be fixed inside of a vehicle, and the actuators can connect the back of the mirror to a back wall of the housing, such that the actuators only control the mirror within the housing and cause the actuators to move around the mirror within the housing.

The arrangements shown in FIGS. 3A-3D control the mirror 310 with a plurality of actuators 330, one in each corner region of the base 320. The base 320 may also have other shapes that may or may not have a corner (e.g., a circle). In the arrangements shown in FIGS. 3A-3D, it will be appreciated that some corner regions may not have an actuator 330, or some corner regions may have more than one actuator 330. There can be additional structures associated with the base 320 to facilitate movement by the actuators 330, such as hinges or pivot joints.

Figure 2:
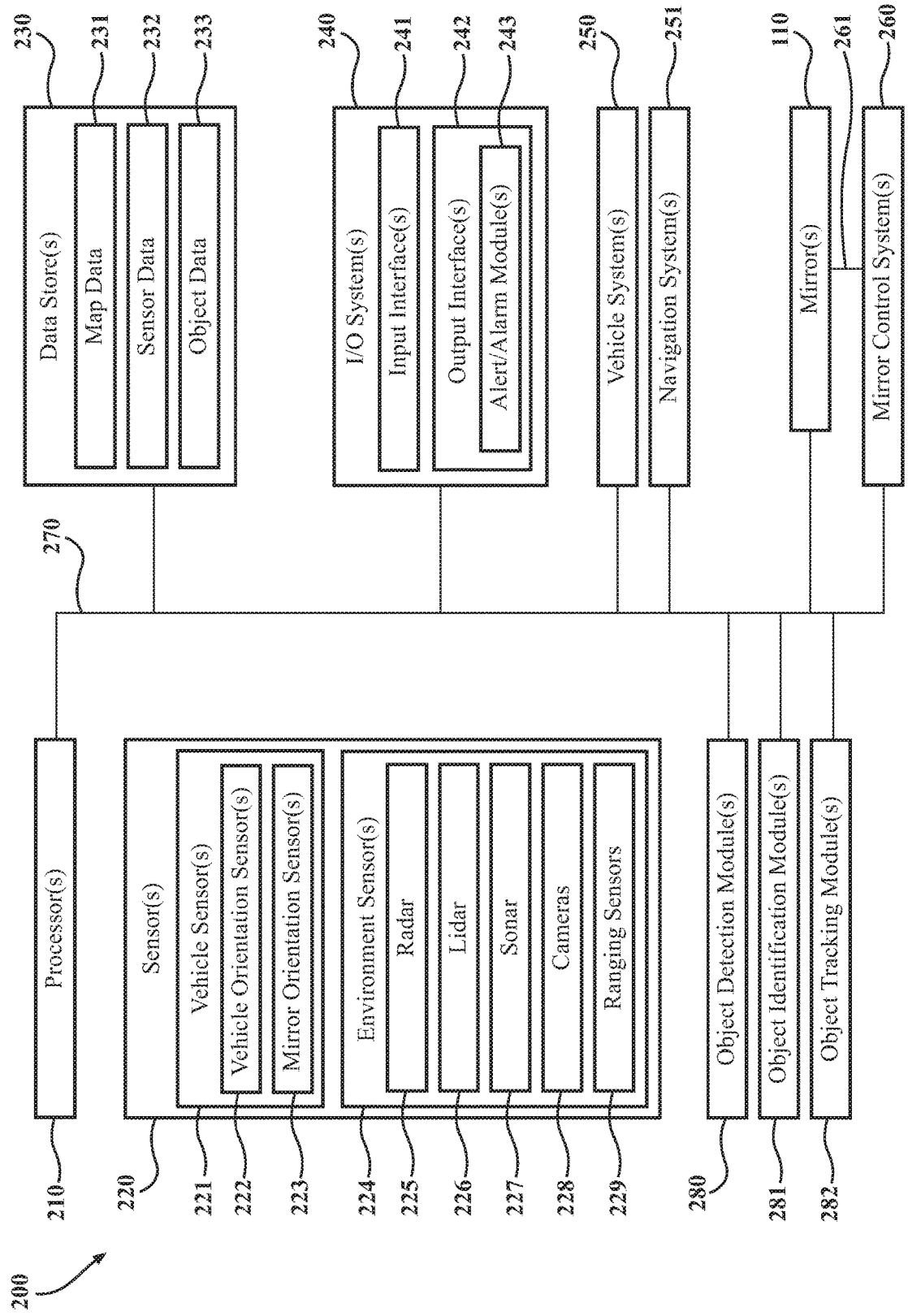
FIG. 2 is a view of various examples of elements of the vehicle.

The vehicle 100 can include various elements. Some of the possible elements of the vehicle 100 are shown in FIG. 2 and will now be described. It will be understood that it is not necessary for the vehicle 100 to have all of the elements shown in FIG. 2 or described herein. The vehicle 100 can have any combination of the various elements shown in FIG. 2. Further, the vehicle 100 can have additional elements to those shown in FIG. 2. In some arrangements, the vehicle 100 may not include one or more of the elements shown in FIG. 2. Further, while the various elements may be shown as being located on or within the vehicle 100 in FIG. 2, it will be understood that one or more of these elements can be located external to the vehicle 100. Thus, such elements are not located on, within, or otherwise carried by the vehicle 100. Further, the elements shown may be physically separated by large distances. Indeed, one or more of the elements can be located remote from the vehicle 100.

The vehicle 100 can include one or more processors 210, one or more sensors 220 (e.g., vehicle sensors 221 and/or environment sensors 224), data store(s) 230, one or more I/O systems 240, one or more vehicle systems 250, navigation systems 252, mirror control system(s) 260, communication network 270, object detection module(s) 280, object identification module(s) 281, and object tracking module(s) 282.

As noted above, the vehicle 100 can include one or more processors 210. "Processor" means any component or group of components that are configured to execute any of the processes described herein or any form of instructions to carry out such processes or cause such processes to be performed. The processor(s) 210 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 210 can include at least one hardware circuit (e.g., an integrated circuit) configured to carry out instructions contained in program code. In arrangements in which there is a plurality of processors 210, such processors can work independently from each other or one or more processors can work in combination with each other. In one or more arrangements, one or more processors 210 can be a main processor(s) of the vehicle 100. For instance, one or more processors 210 can be electronic control unit(s) (ECU).

The vehicle 100 can include one or more power supplies. The one or more power supplies can be any suitable source of electrical power for the mirror assembly 300. In one or more arrangements, the power supply can include one or more batteries. Alternatively or in addition, the power supply can include one or more engines and/or one or more generators. The one or more power supplies can be operatively connected to supply and/or selectively supply electrical energy to the mirror assembly 300 or one or more components thereof.

The vehicle 100 can include one or more sensors 220. "Sensor" means any device, component and/or system that can detect, determine, assess, monitor, measure, quantify, acquire, and/or sense something. The one or more sensors 220 can detect, determine, assess, monitor, measure, quantify, acquire, capture, and/or sense in real-time. As used herein, the term "real-time" means a level of processing responsiveness that a user or system senses as sufficiently immediate for a particular process or determination to be made, or that enables the processor to keep up with some external process.

In arrangements in which there is a plurality of sensors 220, the sensors 220 can work independently from each other. Alternatively, two or more of the sensors 220 can work in combination with each other. In such case, the two or more sensors can form a sensor network. The one or more sensors 220 can be operatively connected to the processor(s) 210, the data store(s) 230, other elements of the vehicle 100, including any of the elements shown in FIG. 2 and/or other elements.

The sensor(s) 220 can include any suitable type of sensor. Various examples of different types of sensors will be described herein. However, it will be understood that the embodiments are not limited to the sensors described.

The sensor(s) 220 can include one or more vehicle sensors 221. The vehicle sensor(s) 221 can detect, determine, assess, monitor, measure, quantify, capture, and/or sense information about the vehicle 100 itself (e.g., position, orientation, yaw, pitch, speed, loading conditions, trailer connection, tire pressure, etc.). In one or more arrangements, the vehicle sensors 221 can include one or more vehicle orientation sensors 222 and one or more mirror orientation sensors 223.

The vehicle orientation sensors 222 can detect, determine, assess, monitor, measure, quantify, and/or sense information about the vehicle 100 itself, such as its location and/or orientation. For example, the vehicle orientation sensors 222 may include a global positioning system (GPS) data that can determine where on the Earth the vehicle is presently located. The vehicle orientation sensors 222 can determine the orientation of the vehicle 100 in a plurality of directions.

The mirror orientation sensors 223 can detect, determine, assess, monitor, measure, quantify, and/or sense information about the physical orientation of the mirror of vehicle 100. For example, the mirror orientation sensors 223 may detect the yaw, roll, and/or pitch of the mirrors of the vehicle 100.

The vehicle sensor(s) 221 can include one or more occupant position sensors. The occupant position sensors can detect the presence and/or position of one or more vehicle occupants. The occupant position sensors can include any suitable sensor, now known or later developed. The vehicle sensor(s) 221 can include one or more eye tracking sensors. The eye tracking sensors can be any suitable eye tracking sensor, now known or later developed. The eye tracking sensors can detect a position of a driver's eyes and changes thereto.

Alternatively or in addition, the vehicle 100 can include one or more environment sensors 224. The environment sensors 224 configured to detect, determine, assess, monitor, measure, quantify, acquire, and/or sense data or information about the external environment in which a vehicle is located or one or more portions thereof. For example, the one or more environment sensors 224 can detect, determine, assess, monitor, measure, quantify, acquire, capture, and/or sense obstacles in at least a portion of the external environment of the vehicle 100 and/or information/data about such obstacles. Such obstacles may be stationary objects and/or dynamic objects. The one or more environment sensors 224 can detect, determine, assess, monitor, measure, quantify, acquire, and/or sense other things in the external environment of the vehicle 100, such as, for example, lane markers, signs, traffic lights, traffic signs, lane lines, crosswalks, curbs proximate the vehicle 100, off-road objects, etc.

Environment information being sensed can include distance to objects; data about objects, such as velocity, acceleration, mass, angle of movement relative to vehicle 100, size, shape, color, etc.; information about the road; traffic information; communication sensors (including transmitters); information about traffic signals or signs; and similar. The environmental sensors may be located at any point on vehicle 100 that allows the sensor to properly sense its intended environment.

In one or more arrangements, the environment sensors 224 can include one or more radar sensors 121, one or more lidar sensors 122, one or more sonar sensors 123, one or more cameras 124, and/or one or more ranging sensors 125. Additionally, other environmental sensors can be present, such as one or more light sensor(s) and/or one or more vehicle communication sensors. Such sensors can be used to detect, determine, assess, monitor, measure, quantify, acquire, and/or sense, directly or indirectly, something about the external environment of the vehicle 100.

The vehicle 100 can include one or more data stores 230 for storing one or more types of data. The data store 230 can include volatile and/or non-volatile memory. Examples of suitable data stores 230 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 230 can be a component of the processor(s) 210, or the data store 230 can be operatively connected to the processor(s) 210 for use thereby.

In one or more arrangements, the one or more data stores 230 can include map data 231. The map data 231 can include maps of one or more geographic areas. In some instances, the map data 231 can include information or data on roads, traffic control devices, road markings, street lights, structures, features, and/or landmarks in the one or more geographic areas. The map data 231 can be in any suitable form. The map data 116 can include measurements, dimensions, distances, positions, coordinates, and/or information for one or more items included in the map data 231 and/or relative to other items included in the map data 231. The map data 231 can include a digital map with information about road geometry. In one or more arrangement, the map data 231 can include information about the ground, terrain, elevation, roads, surfaces, and/or other features of one or more geographic areas. The map data 231 can be high quality and/or highly detailed.

In one or more arrangements, the one or more data stores 230 can include sensor data 232. The sensor data 232 can be raw data stored so that it can be reviewed by modules and systems for them to perform their functions. In one or more arrangements, the one or more data stores 230 can include object data 233. The object data 233 can include data about objects detected by object detection module(s) 280 or common objects that a vehicle may encounter while driving (e.g., vehicles, pedestrians, animals, trees, etc.). As objects are identified and tracked, object identification module(s) 281 and object tracking module(s) 282 may update object detection data with additional data and/or metadata. In some instances, the object data 233 can have metadata including when and how the object was identified.

The vehicle 100 can include an input interface 241. An "input interface" includes any device, component, system, element or arrangement or groups thereof that enable information/data to be entered into a machine. The input interface 241 can receive an input from a vehicle occupant (e.g. a driver or a passenger). Any suitable input interface 241 can be used, including, for example, a keypad, display, touch screen, multi-touch screen, button, joystick, mouse, trackball, microphone and/or combinations thereof.

The vehicle 100 can include an output interface 242. An "output interface" includes any device, component, system, element or arrangement or groups thereof that enable information/data to be presented to a vehicle occupant (e.g. a person, a vehicle occupant, etc.). The output interface 242 can present information/data to a vehicle occupant. The output interface 242 can include a display. Alternatively or in addition, the output interface 242 may include an earphone and/or speaker. Some components of the vehicle 100 may serve as both a component of the input interface 241 and a component of the output interface 242.

The vehicle 100 can include one or more alert or alarm module(s) 243. The alert or alarm module(s) 243 can cause an alert, message, warning, and/or notification to be presented via the output interface(s) 242. The alert or alarm module(s) 243 can cause any suitable type of alert, message, warning, and/or notification to be presented, including, for example, visual, audial, and/or haptic alerts, just to name a few possibilities. The alert or alarm module(s) 243 can be operatively connected to the output interface(s) 242, one or more vehicle systems 250, and/or components thereof to cause the alert to be presented. A visual warning can be presented by one or more components of the output interface(s) 242, such as on one or more displays or one or more lights. Alerts may be sent when the vehicle 100 detects danger, an imminent crash, an obstacle, or otherwise wishes to bring something to a driver's attention.

The vehicle 100 can include one or more vehicle systems 250. The one or more vehicle systems 250 can include a propulsion system, a braking system, a steering system, throttle system, a transmission system, a signaling system, and a navigation system. Each of these systems can include one or more mechanisms, devices, elements, components, systems, and/or combination thereof, now known or later developed. The above examples of the vehicle systems 250 are non-limiting. Indeed, it will be understood that the vehicle systems 250 can include more, fewer, or different vehicle systems. It should be appreciated that although particular vehicle systems are separately defined, each or any of the systems or portions thereof may be otherwise combined or segregated via hardware and/or software within the vehicle 100.

The navigation system(s) 252 can include one or more mechanisms, devices, elements, components, systems, applications and/or combinations thereof, now known or later developed, configured to determine the geographic location of the vehicle 100 and/or to determine a travel route for the vehicle 100. The navigation system 252 can include one or more mapping applications to determine a travel route for the vehicle 100. The navigation system 252 can include a global positioning system, a local positioning system, or a geolocation system.

The processor(s) 210 and/or the mirror control system(s) 260 can be operatively connected to communicate with the various vehicle systems 250 and/or individual components thereof. For example, the sensors(s) 220 may acquire data, which can be analyzed processed by processor(s) 210 in coordination with various modules, such as the object detection module(s) 280 and/or the object tracking module(s) 282. Relevant data and metadata can be stored in the sensor data 232, object data 233, and/or data store(s) 230. Data can be passed to the mirror control system(s) 260, which in conjunction with the processor(s) 210 may decide to autonomously adjust the mirrors 110. Input factors detected by the sensor(s) 220 that can determine when the mirror(s) should be adjusted can include: the ambient conditions, such as weather, amount of icing on the mirrors, visibility, detected bright lights (e.g., high beams) of vehicles behind the host vehicle, animals to be tracked, and passing vehicles, just to name a few possibilities. Additional input factors for the mirror control system(s) 260 can include occupant position data and/or eye tracking data. The mirror control system(s) 260 can determine a target mirror setting (e.g., position and/or orientation) based on any combination of these and other input factors. The mirror control system(s) 260 can then send a control signal or communication signal via control circuit(s) 261 in order to adjust the mirror 110. In this manner, the processor(s) 210 and the mirror control system(s) 260 may control some or all of the mirror(s) 110 and may adjust them.

The mirror control system(s) 260 may communicate with other components of the vehicle 100 for various purposes. For example, when an animal is detected in the external environment, the mirror control system(s) 260 may cause one or more mirrors to move so that the animal is visible to the driver within the mirror. The mirror control system(s) 260 can use data supplied from the object tracking module(s) 282, which in turn relies upon object detection module(s) 280 to begin a tracking operation. Data from the object tracking module(s) 282 can be used to locate the tracked object relative to the vehicle 100. In this manner, the mirror control system(s) 260 determine how to actuate the actuators in order to ensure that the animal is shown in the mirrors.

Additionally, the mirrors 310 can be adjusted manually. For example, a user can adjust the mirror position by inputs provided on the input interface(s) 241. A driver may utilize the I/O system(s) 240 to change the mirrors manually to preferred settings, such as to ensure a maximized reverse field of view leaving little or no blind spots. In yet another embodiment, the mirror control system(s) 260 can use the I/O system(s) 240 to advise the driver or ask the driver for a manual confirmation, so that the adjusting of the mirrors does not distract the driver.

The mirror control system(s) 260 can be configured to analyze data from various sources. In some instances, the mirror control system(s) 260 can take into account competing priorities to ultimately determine whether and how the mirrors 110 should be adjusted.

Various elements of the vehicle 100, such as data store(s) 230 and processor(s) 210, can be communicatively linked to one another or one or more other elements of the vehicle 100 through one or more communication networks 270. As used herein, the term "communicatively linked" can include direct or indirect connections through a communication channel, bus, pathway or another component or system. A "communication network" means one or more components designed to transmit and/or receive information from one source to another. The data store(s) 230 and/or one or more of the elements of the vehicle's digital logic system can include and/or execute suitable communication software, which enables the various elements to communicate with each other through the communication network and perform the functions disclosed herein.

The one or more communication networks can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

The vehicle 100 can include one or more modules, at least some of which will be described herein. The modules can be implemented as computer readable program code that, when executed by a processor, implement one or more of the various processes described herein. One or more of the modules can be a component of the processor(s) 210, or one or more of the modules can be executed on and/or distributed among other processing systems to which the processor(s) 210 is operatively connected. The modules can include instructions (e.g., program logic) executable by one or more processor(s) 210. Alternatively or in addition, one or more data store 230 may contain such instructions. In another embodiment, instead of software implementations, the modules can be created exclusively using hardware, or alternatively as a combination of additional hardware with controllers with software therein.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more object detection modules 280. The object detection module(s) 280 can be configured to detect the presence of an object in the external environment. The object itself may not be directly detectable. The object detection module(s) 280 can detect the presence of an object in any suitable manner, such as by lidar, radar, vehicle communication, sonar, camera data, GPS data, position data, location data, and/or map data 231.

In addition to detecting the presence of an object, the object detection module(s) 280 can be configured to determine a distance between the object and the vehicle 100. These characteristics can be determined in any suitable manner, such as by ranging sensors 229, radar 225, lidar 226, sonar 227, camera 228 (which can include visual or infrared cameras), or any combinations of such techniques.

The vehicle 100 can include one or more object identification modules 281. The object identification module(s) 281 can be configured to determine the identity or nature of a detected object. The object identification module(s) 281 can determine the identity of an object in any suitable manner. In one or more arrangements, the detection can be compared to identifying features of an object, such as color measured visually, shape, size, movement, sounds, etc. In one or more arrangements, the object identification module(s) 281 can compare acquired object data to object data 233 for matches.

The vehicle 100 can include one or more object tracking modules 282. The object tracking module(s) 282 can be configured to determine a movement or trajectory of an object in any suitable manner. In one or more arrangements, the detection can be a time study of an object to determine its position, velocity, acceleration, and jerk factor. For instance, the identification can be performed by detecting when and where an object moves to build a model of how it moves, using environment sensors 224, such as ranging sensors 229, radar 225, lidar 226, sonar 227, camera 228, or any combinations of such techniques.

The object tracking module(s) 282 may communicate directly with the mirror control system(s) 260 when the mirror control system(s) needs to track an object such as an animal or oncoming traffic. Alternatively, object tracking module(s) 282 may store trajectory data in the object data 233 stored on data store 230 for use by the mirror control system(s) 260.

Referring to FIG. 4, an example of an actuator 400 is shown. The actuator 400 can have a body that is, at least in large part, made of a soft, flexible material. It will be understood that the description of the actuator 400 can apply to the actuators 330 shown in FIG. 3. The actuator 400 can include a bladder 440 containing a dielectric fluid 430. The bladder 440 can include a casing 445. The casing 445 can be made of a single piece of material, or a plurality of separate pieces of material that are joined together. An inner surface 447 of the casing 445 can define a fluid chamber. In one or more arrangements, the bladder 440 and/or fluid chamber can be fluid impermeable.

The bladder 440 can be made of any suitable material. For example, the bladder 440 can be made of an insulating material. The insulating material can be flexible. The insulating material can be a polymer and/or an elastomeric polymer (elastomer). The polymers or elastomers can be natural or synthetic in nature. In one or more arrangements, the insulating material can be silicone rubber. Additional examples of the insulating material include nitrile, ethylene propylene diene monomer (EPDM), fluorosilicone (FVMQ), vinylidene fluoride (VDF), hexafluoropropylene (HFP), tetrafluoroethylene (TFE), perfluoromethylvinylether (PMVE), polydimethylsiloxane (PDMS), natural rubber, neoprene, polyurethane, silicone, or combinations thereof.

A dielectric fluid 430 can be any suitable material. In one or more arrangements, the dielectric fluid 430 can be ethylene glycol. As an additional example, the dielectric fluid 430 can include transformer oil or mineral oil. In one or more arrangements, the dielectric fluid 430 can be a lipid based fluid, such as a vegetable oil-based dielectric fluid.

The dielectric fluid 430 can have various associated properties. The dielectric fluid 430 can have an associated dielectric constant. In one embodiment, the dielectric fluid 430 can have a dielectric constant of 1 or greater, 2 or greater, 3 or greater, 4 or greater, 5 or greater, 6 or greater, 7 or greater, 8 or greater, 9 or greater, 10 or greater, 20 or greater, 30 or greater, 40 or greater, 50 or greater, or higher.

In one or more arrangements, the dielectric fluid 430 can be a fluid that is resistant to electrical breakdown. In one or more arrangements, the dielectric fluid 430, can provide electrical insulating properties. In one or more arrangements, the dielectric fluid 430 can provide electrical insulating properties. In one or more arrangements, the dielectric fluid 430 can prevent arcing between surrounding conductors.

The actuator 400 can include a plurality of conductors. In the example shown in FIGS. 4A-4B, the actuator 400 can include a first conductor 410 and a second conductor 420. The conductors 410, 420 can conduct electrical energy. The conductors 410, 420 can be made of any suitable material, such as a conductive elastomer. In one or more arrangements, the conductors 410, 420 can be made of natural rubber with carbon or other conductive particles distributed throughout the material. The conductors 410, 420 can be made of the same material as each other, or the conductors 410, 420 can be made of different materials. One or more of the conductors 410, 420 can be formed by a single, continuous structure, or one or more of the conductors 410, 420 can be formed by a plurality of separate structures.

The first conductor 410 and the second conductor 420 can be located on opposite sides or portions of the bladder 440. Thus, the first conductor 410 and the second conductor 420 can be separated by the bladder 440. The first conductor 410 and/or the second conductor 420 can be operatively connected to the bladder 440 in any suitable manner. In some instances, the first conductor 410 and/or the second conductor 420 can be embedded within a wall of the bladder 440. In one or more arrangements, the first conductor 410 can be operatively positioned between the bladder 440 and an insulating material. In such case, the first conductor 410 can be substantially encapsulated by the bladder 440 and the insulating material. Also, the second conductor 420 can be operatively positioned between the bladder 440 and an insulating material. In one or more arrangements, the second conductor 420 can be substantially encapsulated by the bladder 440 and the insulating material. In one or more arrangements, the insulating material can be made of an insulating elastomer. Thus, it will be appreciated that, at least in some instances, the insulating material can define exterior surfaces of the actuator 400.

Each of the conductors 410, 420 can be operatively connected to receive electrical energy from a power source. As a result, electrical energy can be selectively supplied to each individual conductors 410, 420.

Figure 4A:
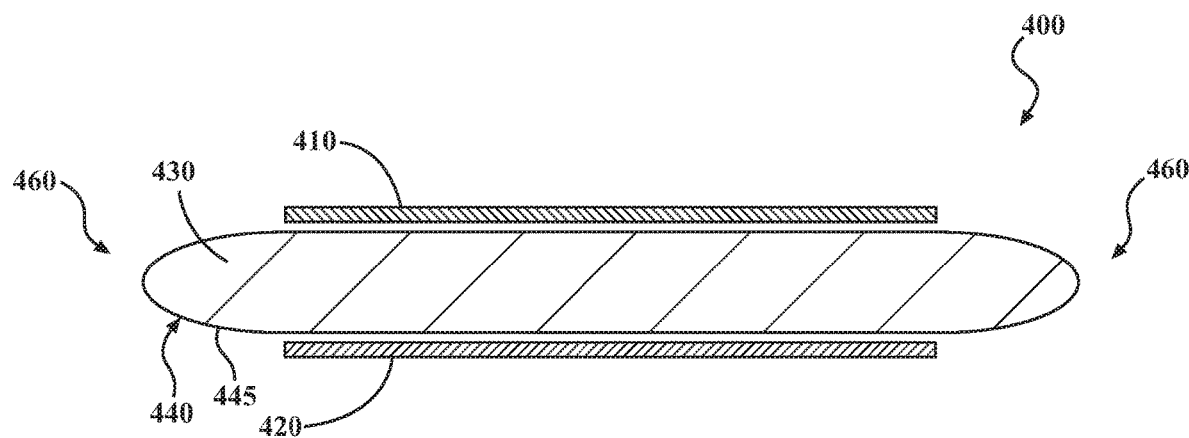
FIG. 4A depicts an example of an actuator, showing a non-actuated condition.

The actuator 400 can have a non-actuated mode and an actuated mode. Each of these modes will be described in turn. FIG. 4A shows an example of a non-actuated mode of the actuator 400. In such case, electrical energy is not supplied to the first conductor 410 and the second conductor 420. Thus, the first conductor 410 and the second conductor 420 can be spaced apart from each other. The bladder 440 can be in a neutral state. A portion of the bladder 440 can extend beyond the outer edges of the first conductor 410 and the second conductor 420.

Figure 4B:
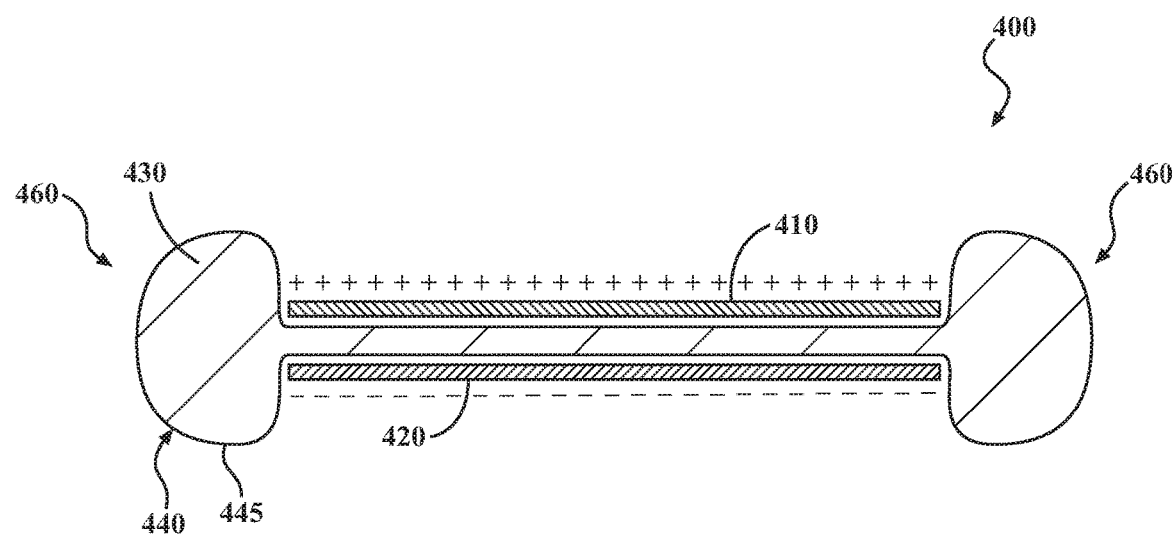
FIG. 4B depicts an example of the actuator, showing an actuated condition.

FIG. 4B shows an example of an actuated mode of the actuator 400. In the actuated mode, power can be supplied to the first conductor 410 and the second conductor 420. In one implementation, the first conductor 410 can become positively charged and the second conductor 420 can become negatively charged. Thus, the first conductor 410 and the second conductor 420 can be oppositely charged. As a result, the first conductor 410 and the second conductor 420 can be attracted toward each other. The attraction between the first conductor 410 and the second conductor 420 can cause them and the respective portions of the bladder 440 to move toward each other. As a result, at least a portion of the dielectric fluid 430 within the fluid chamber can be squeezed toward the outer peripheral region(s) 460 of the bladder 440. In at least some instances, the outer peripheral region(s) 460 of the bladder 440 can bulge, as is shown in FIG. 4B. As the result, the outer peripheral region(s) 460 of the bladder 440 may increase in height (the top to bottom direction on the page).

Figure 5A:
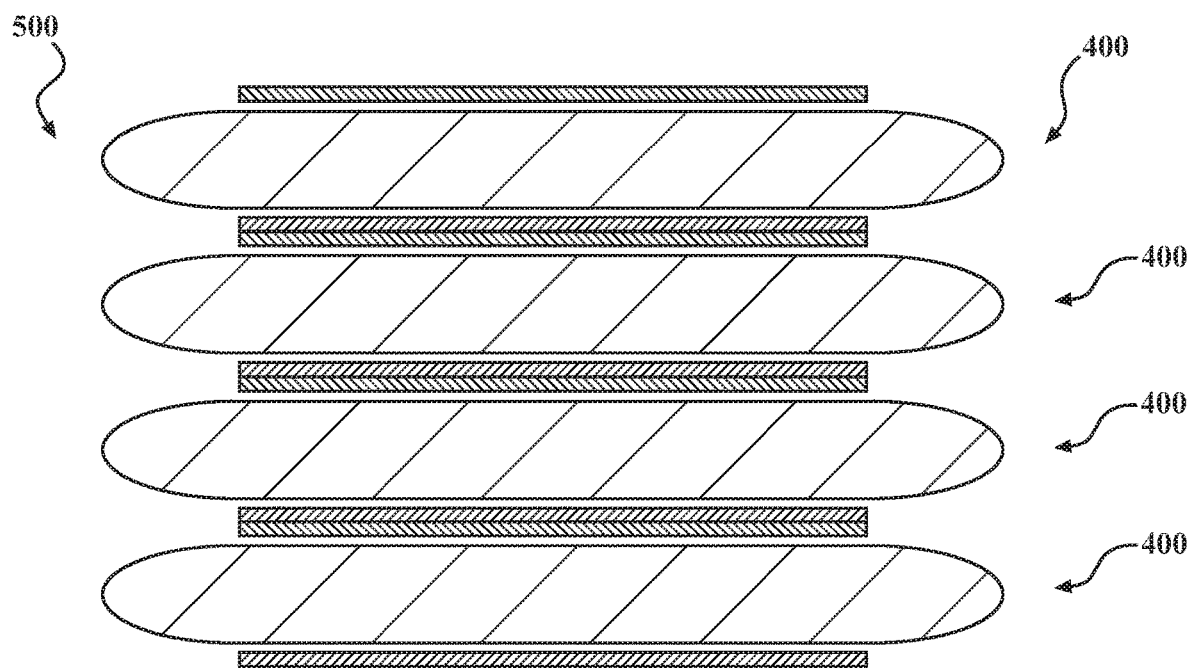
FIG. 5A depicts an example of a plurality of actuators arranged in a stack, showing a non-actuated state.
Figure 5B:
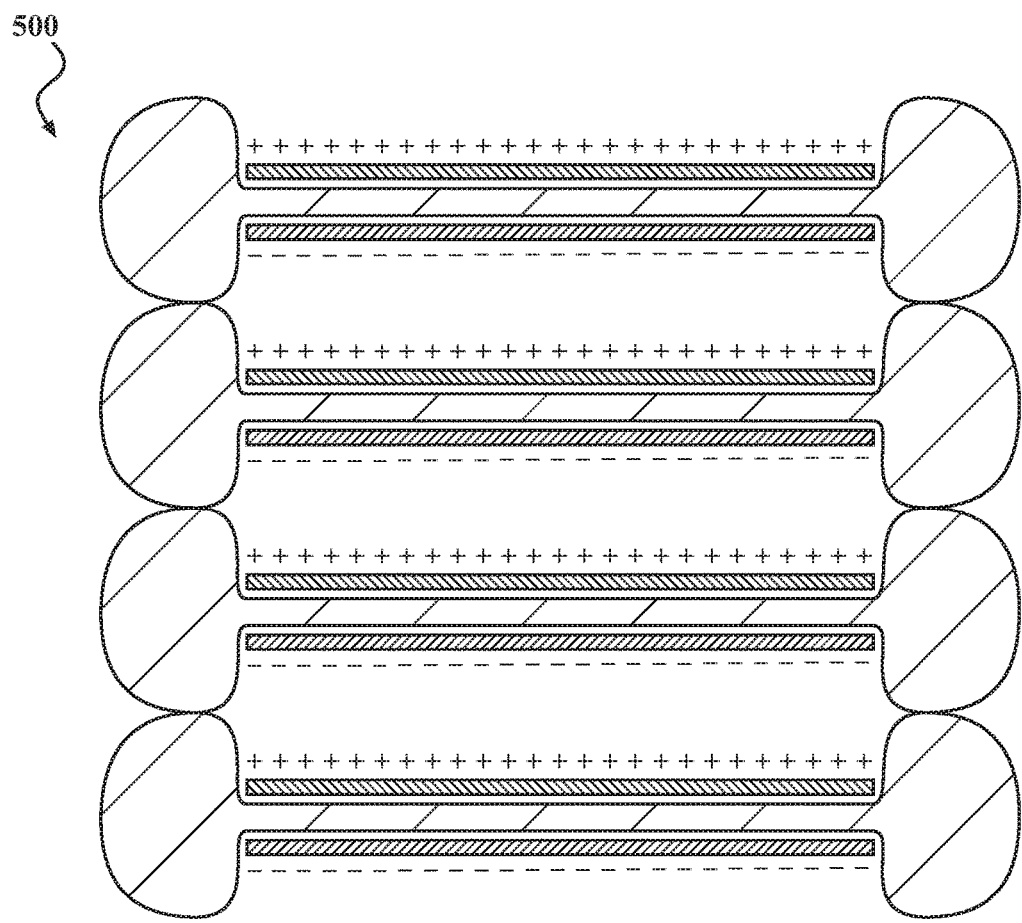
FIG. 5B depicts an example of the plurality of actuators arranged in a stack, showing an actuated state.

FIGS. 5A-5B show an example of an arrangement in which there is a plurality of actuators 400. The actuators 400 can be arranged in a stack 500. FIG. 5A shows the stack 500 in a non-actuated mode. FIG. 5B shows the stack 500 in an actuated mode. The above-description of the actuator 400 in connection with FIGS. 4A-4B applies equally to the individual actuators 400 in the stack 500. It will be appreciated that, in going from the non-actuated mode to the actuated mode, the overall height (the top to bottom direction on the page) of the stack 500 can increase. In such arrangements, it will be appreciated that the actuators 400 in the stack 500 can be actuated individually, collectively, or any combination of two or more of the actuators 400 can be actuated at the same time. In some arrangements, neighboring actuators 400 can be separated by insulating layers.

Now that the various potential systems, devices, elements and/or components of the vehicle 100 have been described, various methods will now be described. Various possible steps of such methods will now be described. The methods described may be applicable to the arrangements described above in relation to FIGS. 1-5, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

The mirror control system(s) 260 constantly monitors environment and vehicle data relevant to its status. It can parse and search data in the data store(s) 230, monitor the sensor(s) 220 directly, can communicate with various modules, such as the object identification module(s) 281, object tracking module(s) 282, vehicle system(s) 250, and/or navigation system(s) 251. The mirror control system(s) 260 can monitor the input interface(s) 241 directly, check for user preferences, and/or may assist in processing such data alongside processor(s) 210. Using this wealth of information, the mirror control system(s) 260 may use data from the data store(s) 230 to determine target settings for the mirror(s).

Figure 6:
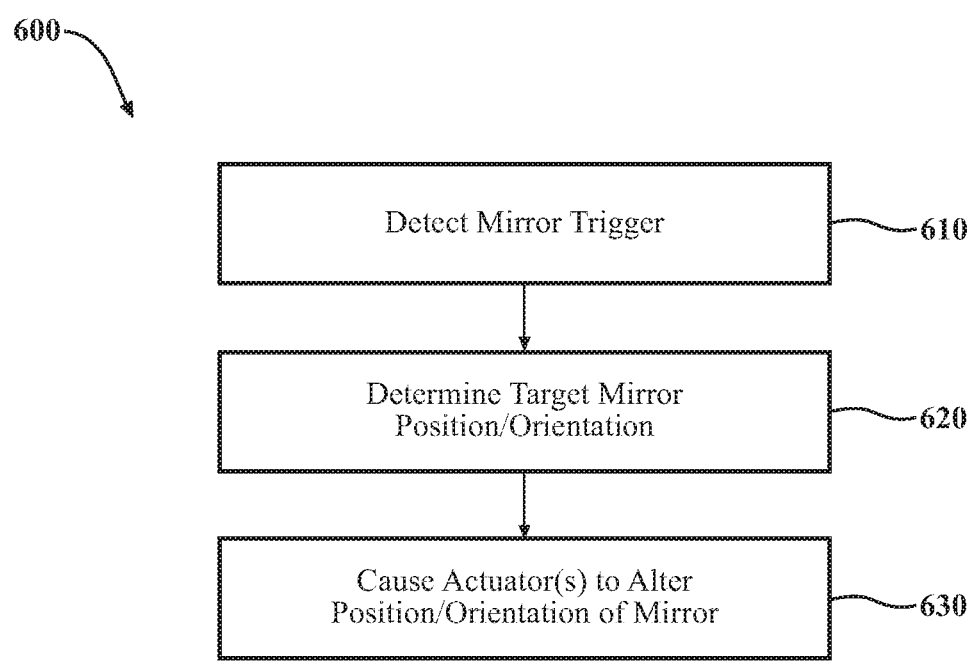
FIG. 6 is an exemplary method of adjusting a vehicle mirror.

Turning to FIG. 6, an example of a method 600 of adjusting vehicle mirrors is shown. At block 610, it can be determined whether a mirror adjustment trigger has been detected. The mirror adjustment trigger can be detected by the object detection module(s) 280, the processor(s) 210, the mirror control system(s) 260, and/or one or more sensor(s) 220. For instance, a mirror adjustment trigger can be detected based on, for example, data acquired by the sensor(s) 220 and/or based on a user input (e.g., a command). Non-limiting examples of the mirror adjustment trigger can include: vehicles approaching from behind with high beams, objects, such as oncoming traffic, a pedestrian, a bicyclist, a stopped car, an emergency vehicle, felled trees and/or power lines, and hazards; merging lanes, such as driveways, exit lanes, intersections, and the like; environmental conditions, such as fog, poor visibility, rain, snow, other precipitation, slippery roads, potholes, and the like; and other useful reasons to control actuated mirrors.

If a mirror adjustment trigger is not detected, the method 600 can end, return to block 610, or proceed to some other block. However, if a mirror adjustment trigger is detected, then the method can proceed to block 620.

At block 620, responsive to detecting a mirror adjustment trigger, a target mirror position or orientation can be determined based on the mirror adjustment trigger. Such a determination can be made by, for example, the processor(s) 210 and/or the mirror control system(s) 260. For instance, when the vehicle detects another vehicle approaching from behind with its high beams activated that could blind the driver, the mirror control system(s) can determine how to orient one or more to reduce or avoid the effect of the driver.

At block 630, one or more actuators can be caused to actuate so as to alter a position or orientation of the mirror to the target mirror position or orientation. Such causing can be implemented in any suitable manner. For instance, in one or more arrangements, the processor(s) 210 and/or the mirror control system(s) 260 can activate one or more actuators 400 by allowing electrical energy from a power source to be supplied to the actuator(s) 400.

After block 630, the method 600 can end. Alternatively, the method 600 can return to block 610 or some other block. The method 600 can be performed continuously, periodically, irregularly, randomly, or responsive to a condition, event, or input.

It will be appreciated that arrangements described herein can provide numerous benefits, including one or more of the benefits mentioned herein. For example, arrangements described herein can facilitate autonomously or manually reorienting and repositioning actuated mirrors. Arrangements described herein can move to prevent blinding a driver due to another vehicle's high beams at night. Arrangements described herein can autonomously track passing vehicles, so a vehicle's blind spot is minimized. Arrangements described herein can independently control mirrors, where each mirror acts to perform a different function or track a different object or avoid a different set of high beams. Arrangements described here can avoid the use of complicated gears and actuators. Arrangements described herein can enable more compact designs and packaging for actuators. Arrangements described herein can provide for more efficient use of power.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A mirror assembly, comprising:
    a mirror, the mirror being a vehicle mirror;
    a base, the mirror being operatively connected to the base; and
    at least one actuator including:
        a bladder, the bladder including a flexible casing and defining a fluid chamber, the fluid chamber including a dielectric fluid; and
        a first conductor and a second conductor operatively positioned on opposite portions of the bladder,
    the at least one actuator being configured such that, when electrical energy is supplied to the first conductor and the second conductor, the first conductor and the second conductor have opposite charges, whereby the first conductor and the second conductor are electrostatically attracted toward each other to cause at least a portion of the dielectric fluid to be displaced to an outer peripheral region of the fluid chamber,
    the at least one actuator being operatively connected to a corner region or an edge region of the base, and the at least one actuator being operatively positioned to cause a position and/or an orientation of the mirror to be adjusted.

2. The mirror assembly of claim 1, wherein the at least one actuator is a plurality of actuators.

3. The mirror assembly of claim 1, wherein the at least one actuator is configured for a yaw adjustment of the mirror.

4. The mirror assembly of claim 1 wherein the at least one actuator is configured for a pitch adjustment of the mirror.

5. The mirror assembly of claim 1, wherein the at least one actuator is configured to control the position and/or the orientation of the base on a plurality of different axes.

6. The mirror assembly of claim 1, wherein the at least one actuator includes a plurality of actuators, and wherein the actuators are arranged in a stack.

7. A mirror system comprising:
    a mirror, the mirror being a vehicle mirror;
    a base, the mirror being operatively connected to a corner region or an edge region of the base;
    at least one actuator operatively positioned to adjust a position or an orientation of the mirror, the at least one actuator being operatively connected to the base, the at least one actuator including a bladder, the bladder including a flexible casing and defining a fluid chamber, the fluid chamber including a dielectric fluid, the at least one actuator including a first conductor and a second conductor operatively positioned on opposite portions of the bladder;
    a power source operatively connected to supply electrical energy to first conductor and the second conductor; and
    one or more processors operatively connected to selectively control a supply of electrical energy from the power source to the first conductor and the second conductor,
    the at least one actuator being configured such that, when electrical energy is supplied to the first conductor and the second conductor, the first conductor and the second conductor have opposite charges, whereby the first conductor and the second conductor electrostatically attract each other to cause at least a portion of the dielectric fluid to be displaced to an outer peripheral region of the fluid chamber, and whereby the position or the orientation of the mirror is adjusted.

8. The mirror system of claim 7, wherein the one or more processors are configured to automatically adjust the position and/or the orientation of the mirror.

9. The mirror system of claim 7, further including an input interface operatively connected to the one or more processors, wherein the one or more processors are configured to selectively control a supply of electrical energy from the power source to the first conductor and the second conductor based on inputs received on the input interface, whereby the position and/or the orientation of the mirror is adjusted based on inputs received on the input interface.

10. The mirror system of claim 7, further including one or more sensors operatively connected to the one or more processors, wherein the one or more processors are configured to selectively control a supply of electrical energy from the power source to the first conductor and the second conductor based on sensor data acquired by the one or more sensors, whereby the position and/or the orientation of the mirror is adjusted based on sensor data acquired by the one or more sensors.

11. The mirror system of claim 10, wherein the one or more sensors includes one or more occupant position sensors or one or more eye tracking sensors.

12. A method of adjusting a position and/or an orientation of a mirror, the method comprising:
    detecting a mirror adjustment trigger;
    responsive to detecting a mirror adjustment trigger, determining a target mirror position or orientation based on the mirror adjustment trigger; and causing one or more actuators to actuate to alter a position or orientation of a mirror to the target mirror position or orientation, the mirror being operatively connected to a corner region or an edge region of a base, the one or more actuators being operatively connected to the base, and the one or more actuators being operatively positioned to adjust the position and/or the orientation of the mirror, the mirror being a vehicle mirror, the one or more actuators including:
- a bladder, the bladder including a flexible casing and defining a fluid chamber, the fluid chamber including a dielectric fluid; and
- a first conductor and a second conductor operatively positioned on opposite portions of the bladder, the one or more actuators being configured such that, when electrical energy is supplied to the first conductor and the second conductor, the first conductor and the second conductor have opposite charges, whereby the first conductor and the second conductor are electrostatically attracted toward each other to cause at least a portion of the dielectric fluid to be displaced to an outer peripheral region of the fluid chamber.

13. The method of claim 12, wherein the one or more actuators is a plurality of actuators, and wherein each of the plurality of actuators is independently actuated to control the position and/or the orientation of the mirror.

14. The method of claim 13, wherein different control signals are applied to different actuators of the plurality of actuators to achieve non-uniform states for the actuators.

15. The method of claim 12, wherein the one or more actuators are configured for a yaw adjustment of the mirror.

16. The method of claim 12, wherein the one or more actuators are configured for a pitch adjustment of the mirror.

17. The method of claim 12, wherein the one or more actuators is a plurality of actuators, and wherein the plurality of actuators are arranged in a stack.

* * * * *